(12) United States Patent
Kim et al.

(10) Patent No.: US 10,928,342 B2
(45) Date of Patent: Feb. 23, 2021

(54) COMPOSITE MICRO-SENSOR FOR DETECTING FREE RADICALS

(71) Applicant: The University of Toledo, Toledo, OH (US)

(72) Inventors: Dong-Shik Kim, Toledo, OH (US); Surachet Duanghathaipornsuk, Toledo, OH (US)

(73) Assignee: The University of Toledo, Toledo, OH (US)

( * ) Notice: Subject to any disclaimer, the term of this patent is extended or adjusted under 35 U.S.C. 154(b) by 241 days.

(21) Appl. No.: 16/242,397

(22) Filed: Jan. 8, 2019

(65) Prior Publication Data

US 2019/0212286 A1     Jul. 11, 2019

Related U.S. Application Data

(60) Provisional application No. 62/615,792, filed on Jan. 10, 2018.

(51) Int. Cl.
*G01N 27/30*     (2006.01)
*G01N 27/02*     (2006.01)
*G01N 27/327*     (2006.01)

(52) U.S. Cl.
CPC .......... *G01N 27/026* (2013.01); *G01N 27/30* (2013.01); *G01N 27/3277* (2013.01)

(58) Field of Classification Search
CPC ... G01N 27/026; G01N 27/3277; G01N 27/30
See application file for complete search history.

(56) References Cited

U.S. PATENT DOCUMENTS

2017/0108752 A1*   4/2017   Milliron ................ G02F 1/1524

* cited by examiner

*Primary Examiner* — Jennifer Wecker
*Assistant Examiner* — Michael Paul Shimek
(74) *Attorney, Agent, or Firm* — MacMillan, Sobanski & Todd, LLC

(57) ABSTRACT

A sensor and method for detecting free radicals in a sample includes providing an electrode at least partially coated with: an inner coating of a first material capable of catalyzing rapid electron transfer; and, an outer coating at least partially coating the inner coating. The outer coating can be a second material comprised of a cerium oxide/graphene composite.

10 Claims, 13 Drawing Sheets
(13 of 13 Drawing Sheet(s) Filed in Color)

COMPOSITE MICRO-SENSOR FOR DETECTING FREE RADICALS

CROSS-REFERENCE TO RELATED APPLICATIONS

This is application claims the priority to U.S. Provisional Application No. 62/615,792 filed Jan. 10, 2018, the entire disclosures of which are expressly incorporated herein by reference.

STATEMENT REGARDING FEDERALLY SPONSORED RESEARCH

This invention was not made with any government support, and the government has no rights in the invention.

BACKGROUND OF THE INVENTION

Measurements for reactive oxygen species (ROS, or free radicals) are frequently practiced in a very broad range of medical and clinical research including cell biology, pathology, hematology, immunology, oncology, radiology. Because certain types of free radicals are known to cause or exacerbate illnesses such as cancer, tumor, and neurodegenerative diseases, detection and identification of free radicals are very critical as biomarkers in diagnosing and healing the diseases. Hospital labs, chemical testing labs, and biochemical technology companies routinely run free radical measurements on various blood, body fluid, and tissue samples in vivo or in vitro. For example, a total of 4.8 billion dollars was used for cancer research in the US in 2013, and a great portion of it was used for free radical analyses.

Currently various methods are used to detect the type and concentration of intracellular and intercellular ROS. In general, these methods use either free radical trapping methods or fingerprinting methods. In free radical trapping methods, trap molecules such as dimethylpyrroline-N-oxide (DMPO) and α-phenyl-tert-butylnitrone (PBN) are used to trap free radicals and then electron spin resonance (ESR), sometimes called electron paramagnetic resonance (EPR), is used to measure the concentration of radical trapping molecules. This is only a direct method to measure free radicals, but it is known to be too insensitive to detect superoxide ($O_2^-$.) and hydroxyl (OH.) radicals. Often the trap molecules perturb the system under investigation as they trap free radicals which results in decreasing the damage of free radicals to biological systems. Moreover, they are sometimes rapidly metabolized or oxidized in vivo resulting in inaccurate measurements.

More common methods being practiced in many research labs are fingerprinting methods, indirect methods by measuring the damage that free radicals cause, known as oxidative damage biomarkers. For example, 2-deoxyribose, a component of DNA, is easily decomposed by hydroxyl radicals. Therefore, radical concentration can be estimated by measuring the byproduct of the reaction between deoxyribose and OH radicals. 2,2'-azino-bis(3-ethylbenzothiazoline-6-sulphonic acid) (ABTS) is a molecule that is easily oxidized by hydroxyl or superoxide radicals with high affinity, and upon reaction, changes color, which can be read by a spectrometer.

Another common biomarker is glutathione, a tripeptide that defends important cellular components from free radicals. These fingerprinting methods are time-consuming and labor-intensive. These biomarkers are susceptible to other reactions with various chemicals and free radicals. For one set of free radical analysis, it costs $500-$1,000.

One more fundamental drawback in these methods stated above lies in the analysis procedure. For these methods, an aliquot of sample should be taken from a source and transported to the laboratory where ESR or colorimetric methods can be performed. For example, a biopsy is usually practiced on a suspected area of patient with cancer or tumor, and the tissue or fluid from a patient is examined for the presence or extent of disease. In this procedure, contents of free radicals, which can be a good indication of disease, may change significantly due to the short life-time of free radicals. Likewise, environmental samples taken from a source of pollution to a laboratory may not accurately show its contents of free radicals due to disappearance of free radicals in the isolated sample during sampling, transportation, and preparation for analysis.

There is no admission that the background art disclosed in this section legally constitutes prior art.

SUMMARY OF THE INVENTION

In a first broad aspect, there is provided a sensor for detecting free radicals in a sample. The sensor includes comprising an electrode having proximal end and a distal end. The distal end is at least partially coated with an inner coating comprised of a first material capable of catalyzing rapid electron transfer. An outer coating at least partially coats the inner coating. The outer coating is comprised of a second material comprised of a cerium oxide/graphene composite.

In certain embodiments, the second material has enhanced selectivity toward hydroxyl radicals, and improved reversibility of oxidation-reduction reaction.

In certain embodiments, the electrode is a glassy carbon, gold, silver or platinum electrode.

In certain embodiments, the free radicals are reactive oxygen species (ROS)

In certain embodiments, the sensor is further coated with permeable layer to separate the second coating composite from contact with a tissue sample.

In certain embodiments, the first and second coatings undergo a redox reaction when in the presence of free radicals in the sample.

In certain embodiments, the electrode is configured to receive a signal from the redox reaction, which signal is analyzed with electrochemical impedance spectroscopy (EIS).

In another aspect, there is provided herein a method for making a sensor capable of sensing free radicals. The method includes: i) at least partially coating at least a distal end of an electrode with a first material capable of catalyzing rapid electron transfer; and, ii) at least partially coating a cerium/graphene composite on the coated distal end of the electrode of step i).

In certain embodiments, step ii) includes running a cyclic voltammetry to achieve the cerium/graphene composite deposition on the electrode.

In certain embodiments, step ii) includes running electrochemical impedance spectroscopy (EIS) in a range of 100 mHz to 100 Hz.

Various objects and advantages of this invention will become apparent to those skilled in the art from the following detailed description of the preferred embodiment, when read in light of the accompanying drawings.

BRIEF DESCRIPTION OF THE DRAWINGS

The patent or application file may contain one or more drawings executed in color and/or one or more photographs.

Copies of this patent or patent application publication with color drawing(s) and/or photograph(s) will be provided by the U.S. Patent and Trademark Office upon request and payment of the necessary fees.

DETAILED DESCRIPTION OF THE PREFERRED EMBODIMENT(S)

Throughout this disclosure, various publications, patents and published patent specifications are referenced by an identifying citation. The disclosures of these publications, patents and published patent specifications are hereby incorporated by reference into the present disclosure to more fully describe the state of the art to which this invention pertains.

Described herein is a sensor that can be inserted directly into the tissue or liquid samples. The sensor produces consistent and accurate results. In certain embodiments, the measuring time is less than 1 min. In addition, the sensor can be reused, which can save significant amounts of economic resources.

The sensor comprises an electrode having a composite material at a distal end. The composite material includes a transition metal and inorganic materials such as graphene and Prussian blue. The composite material has enhanced selectivity toward hydroxyl radicals, and improved reversibility of oxidation-reduction reaction.

For example, a cerium nanoparticles-graphene-based composite is adsorbed on a Prussian blue layer which is then deposited on a graphite electrode.

Figure 1A:
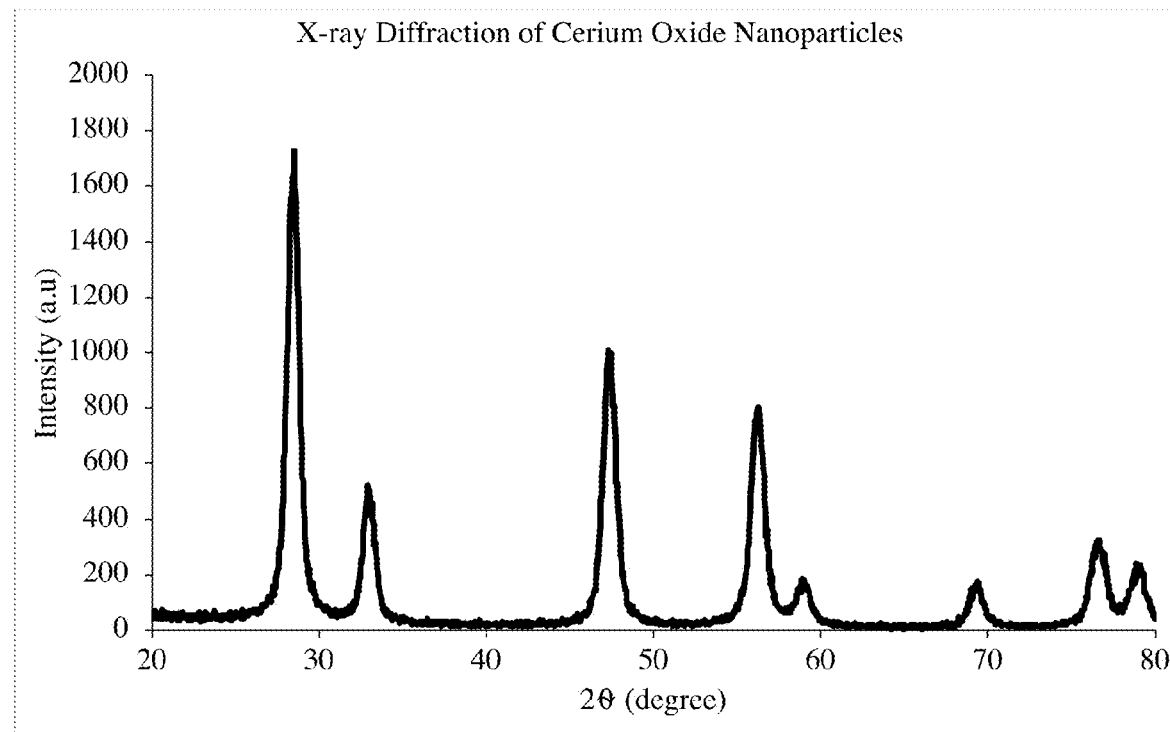
FIG. 1A. XRD of cerium composite with graphene.

Formation of the composite of cerium and graphene has been verified using X-ray diffraction (XRD) spectroscopy as shown in FIG. 1A. The XRD result showed a typical wave length pattern of cerium.

Example 1—for the Preparation of Prussian Blue

Materials used: $K_3[Fe(CN)_6]$, $FeCl_3$, KCl, HCl, glassy carbon electrode, Buffer saline phosphate, $K_3[Fe(CN)_6]$, $K_4[Fe(CN)_6]$, $H_2SO_4$ A Prussian blue is deposited on the surface of a glassy carbon electrode as follows:

(i) Prepare 2 mM of $K_3[Fe(CN)_6]$ in 0.1 M of KCl+0.1 M of HCl in 20 ml of deionized water.

(ii) Prepare 2 mM of $FeCl_3$ in 20 ml of deionized water at pH=2.0.

Mix solution from (i) and (ii) together with equal volume to form the Prussian blue solution.

Prepare 0.1 M of KCl and 0.1 M of HCl in 20 ml of deionized water to be used as activating solution.

Prepare 5 mM $K_3[Fe(CN)_6]$+5 mM $K_4[Fe(CN)_6]$+100 mM KCl in 0.05 M of PBS at PH=7.

Prepare 0.1 N of $H_2SO_4$.

Example 2—for Preparation of Cerium/Graphene Composite Deposition

Materials: Deionized (DI) water, Graphene oxide (GO), Cerium oxide.

Cerium oxide, $CeO_2$, was dispersed in 100 ml of water by applying ultrasonication, and 1 mg of reduced graphene was added to the dispersion.

The dispersion was maintained at room temperature with constant stirring for 2 hours.

The final product was collected and dried in vacuum at 60° C. for 24 h.

Example 3 for Preparation of Sensor

First Step:
Prepare an activated electrode by inserting an electrode into 0.1 N of $H_2SO_4$.

Run a cyclic voltammetry with scanning for 3 cycles.

Clean the surface of the electrode with deionized water.

Run cyclic voltammetry in the potential range −1.2 to 1.2 V at a sweep rate of 100 mV/s for 5 cycles to form an activated electrode. Note that electrochemical impedance spectroscopy on a bare glassy carbon electrode can be used as a reference of unmodified glassy carbon electrode.

Second Step:
Sonicate the Prussian blue solution for 10 minutes.

Put the activated electrode into the Prussian blue solution, and run cyclic scanning in the potential range of 0.3 to 0.8 V at a sweep rate of 40 mV/s for 20 cycles to deposit Prussian blue on the surface of the electrode. Wash all electrodes with deionized water.

Activate all modified electrodes in activating solution with −0.05 to 0.35 V at a sweep rate of 40 mVs$^{-1}$ until obtaining a stable graph. Clean again with deionized water. Dry at 80° C. for 1 hour.

Third Step:
Insert the coated electrode of step two into the cerium/graphene composite solution, for at least about an hour.

A cyclic voltammetry was run in the range of −1.7 V to 1.7 at a sweep rate of 40 mV/s for 20 cycles to achieve the cerium/graphene composite deposition on glassy carbon electrode.

Figure 3:
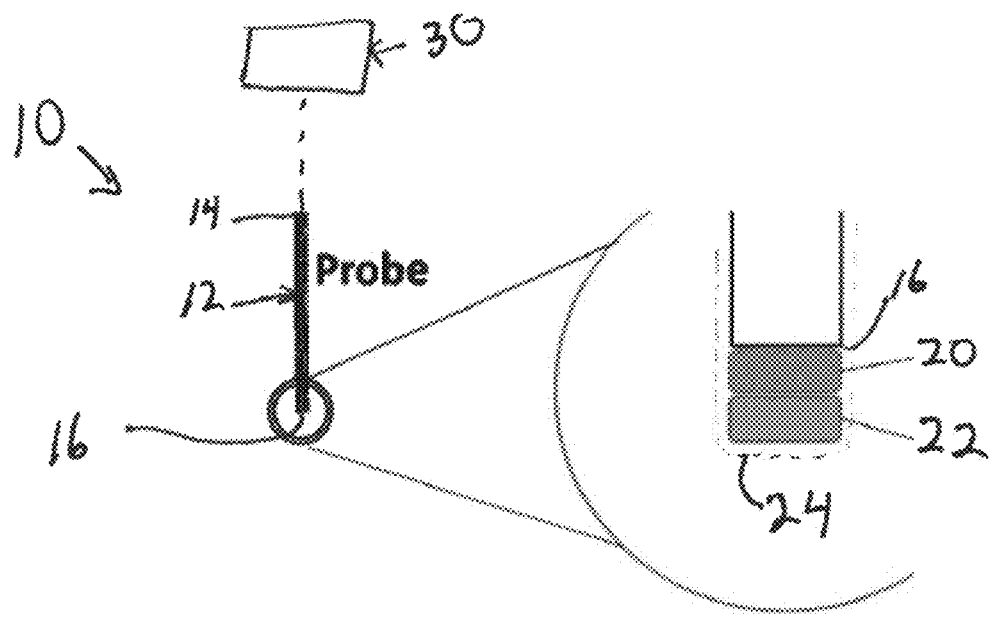
FIG. 3. Schematic design of the composite sensor.

A schematic illustration of one example of a coated sensor 10 is shown in FIG. 3. The sensor 10 includes an electrode 12 having proximal end 14 and a distal end 16. The distal end 16 is at least partially coated with an inner coating 20 and an outer coating 22 at least partially coating the inner coating 20. The inner coating 20 comprises a first material capable of catalyzing rapid electron transfer (e.g., Prussian blue). The outer coating 22 comprises a second material comprised of a cerium oxide/graphene composite. In one embodiment, the electrode 12 is a graphite electrode. In certain embodiments, the diameter of the electrode can range from about 0.3 mm to about 2 mm.

The redox signal generated from the sensor 10 can be transduced to a microprocessor 30 that converts the signal to an equivalent concentration. The signal from the redox reaction can then be analyzed with electrochemical impedance spectroscopy (EIS).

Figure 1B:
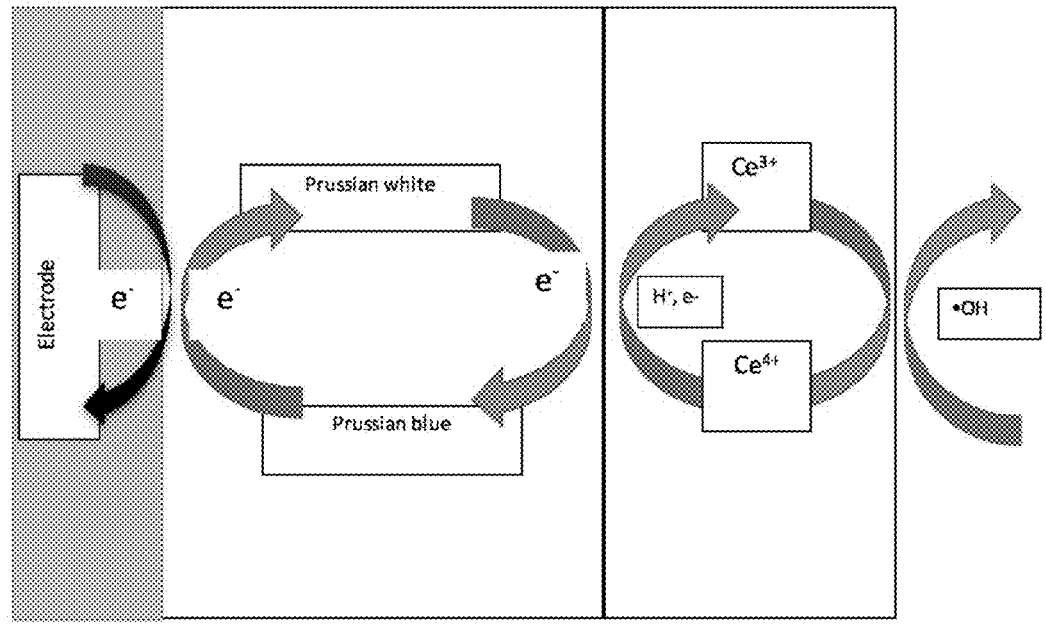
FIG. 1B. Schematic illustration of electron transfer in a composite sensor.
Figure 1C:
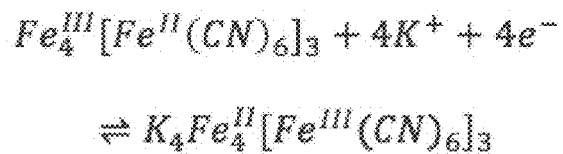
FIG. 1C. Description of the electron transfer occurring within a layer of Prussian blue of a composite sensor.
Figure 1D:
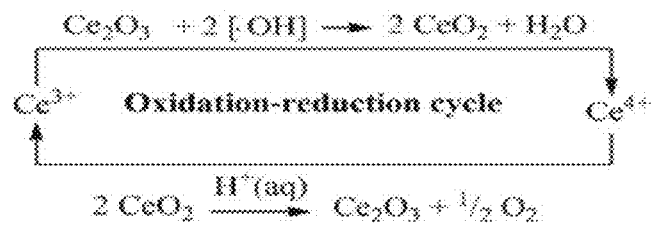
FIG. 1D. Description of an oxidation-reduction cycle occurring in a Ce/graphene layer of a composite sensor.

FIG. 1B provides a schematic illustration of electron transfer within the first coating 20 and the second coating 22 of the sensor 10. FIG. 1C provides a description of the electron transfer occurring within the first coating 22 (e.g., a layer of Prussian blue) of the sensor 10. FIG. 1D provides a description of an oxidation-reduction cycle occurring in the second coating 22 (e.g., Ce/graphene layer) of the sensor 10.

Depending on the structure of the samples being tested, the sensor can be modified. In one embodiment, the sensor 10 is at least partially coated with a permeable layer 24 such as Nafion (sulfonated tetrafluoroethylene based fluoropolymer-copolymer) or cellulose acetate, to effectively separate the first and/or second coatings 20, 22 from any direct contact with a sample, such as a tissue. The free radicals in the blood and/or cellular fluid in such tissue will diffuse through the permeable layer 24, and contact the second coating 22.

EXAMPLES

Certain embodiments of the present invention are defined in the Examples herein. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

The composite sensor shown in FIG. 3 was tested with hydrogen peroxide ($H_2O_2$) and hydroxyl radicals (OH.). Hydrogen peroxide was selected as a control species because it is the most closely related chemical species to hydroxyl radicals, and a high selectivity of the sensor for hydroxyl radicals from hydrogen peroxide is required.

Figure 2:
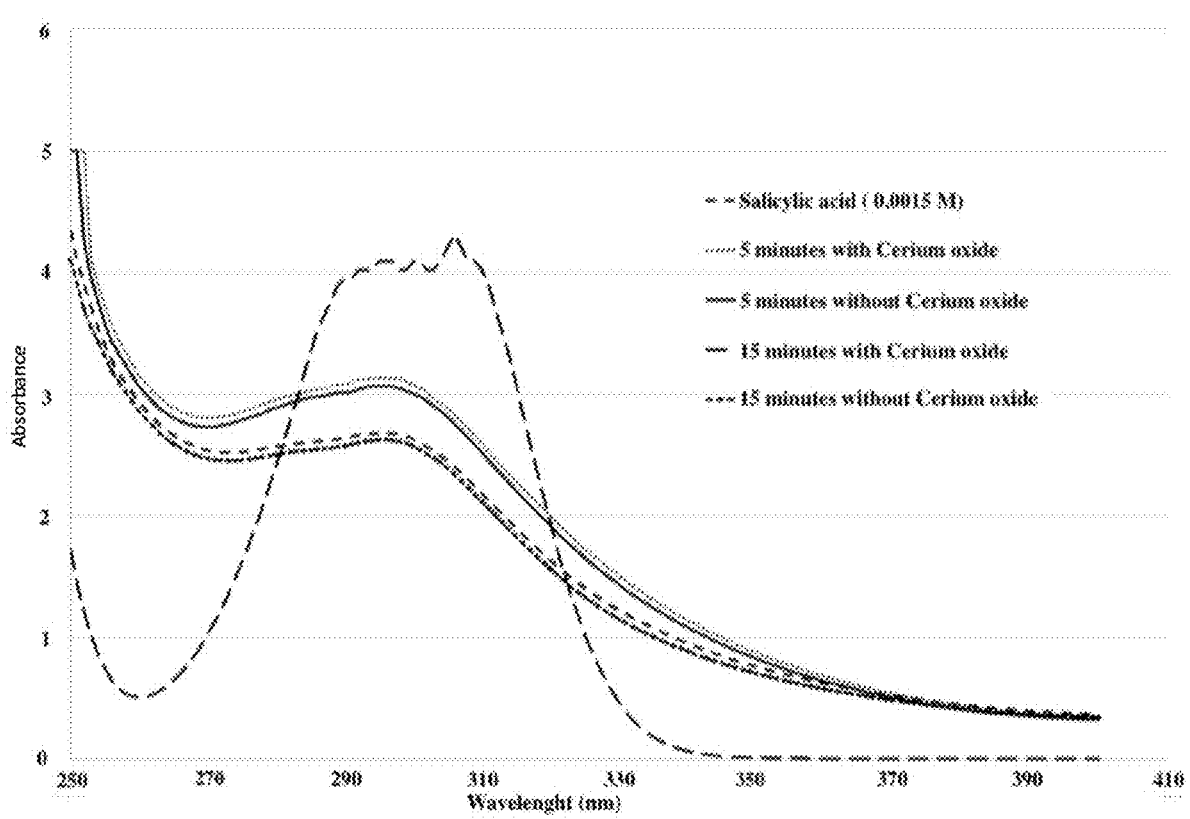
FIG. 2. UV-spectrometry results of the reaction of ceria and hydroxyl radical.

The glassy carbon electrode immobilized with the cerium/graphene composite was tested with hydroxyl radical generated using the Fenton reaction. The redox reaction between cerium and hydroxyl radical was measured using UV-spectrometry. The UV-spectrometry results shown in FIG. 2 demonstrate the sensitivity of graphene/cerium composite toward hydroxyl radical. When 0.0015 M of salicylic acid was present, it showed a typical peak for hydroxyl radical at 313 nm. In the presence of ceria, the OH. peak decreased after 15 min due to the reaction between cerium and OH.

As noted above, since glutathione is now believed to be an important intra-cellular defense component against the deleterious effects of reactive oxygen species, fingerprinting with glutathione may be the biggest competitor against the proposed composite sensor. However, due to the inherent nature of biological component, glutathione is easily degraded during redox reactions with hydroxyl radicals. Therefore, glutathione cannot be re-used many times, no more than 7-10 times through a reverse reaction, with, for example, NADH and glutathione reaction, which is costly and time-consuming. It was determined by the inventors herein that the sensitivity of glutathione decreased below 50% after a few redox reactions. Also, glutathione costs $300-1,000.

In comparison, the sensor described herein is competitively priced, and can be re-used many time without compromising its sensitivity.

Figure 4A:
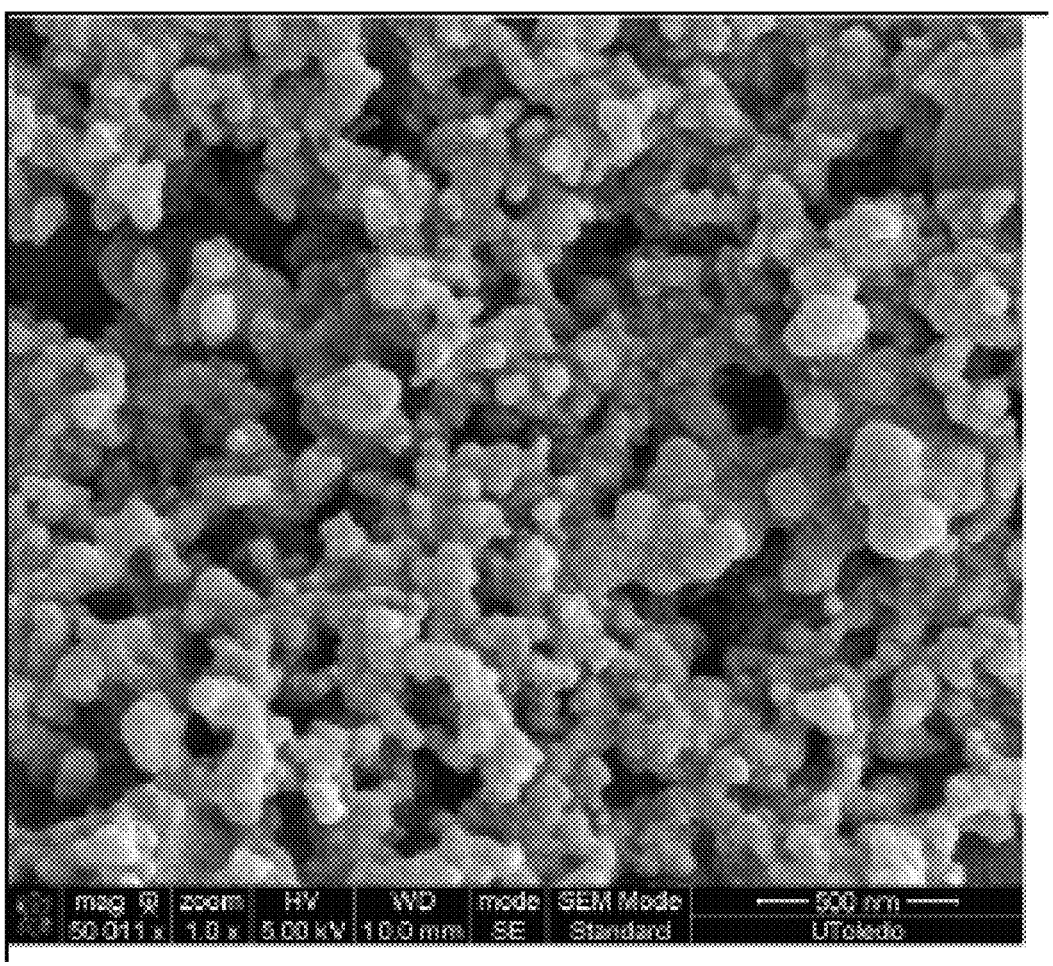
FIG. 4A. Scanning Electron Microscopy (SEM) image of bare graphite electrode surface.
Figure 4B:
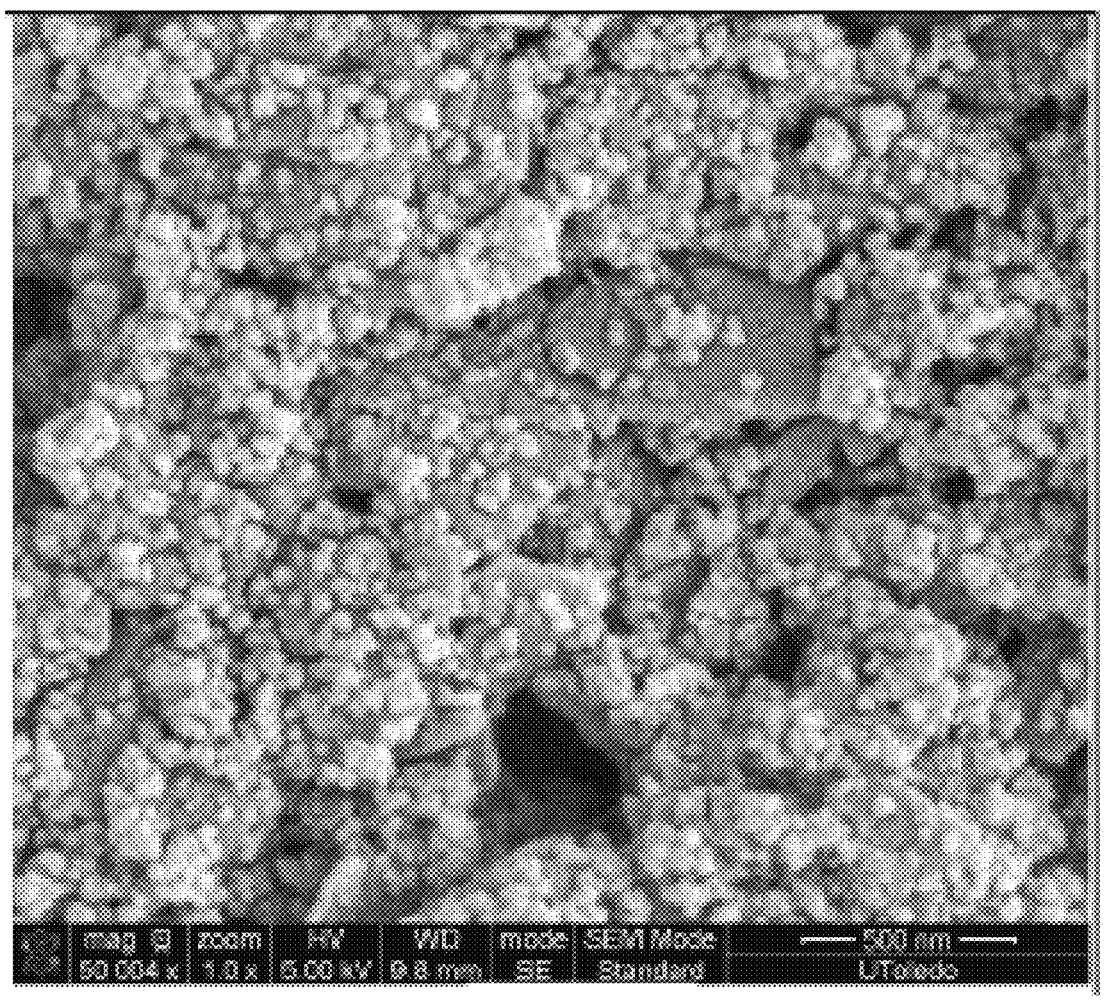
FIG. 4B. Scanning Electron Microscopy (SEM) image of cerium/graphene composite deposited on the graphite surface FIG. 4C. Scanning Electron Microscopy (SEM) images of a glassy carbon electrode.
Figure 4C:
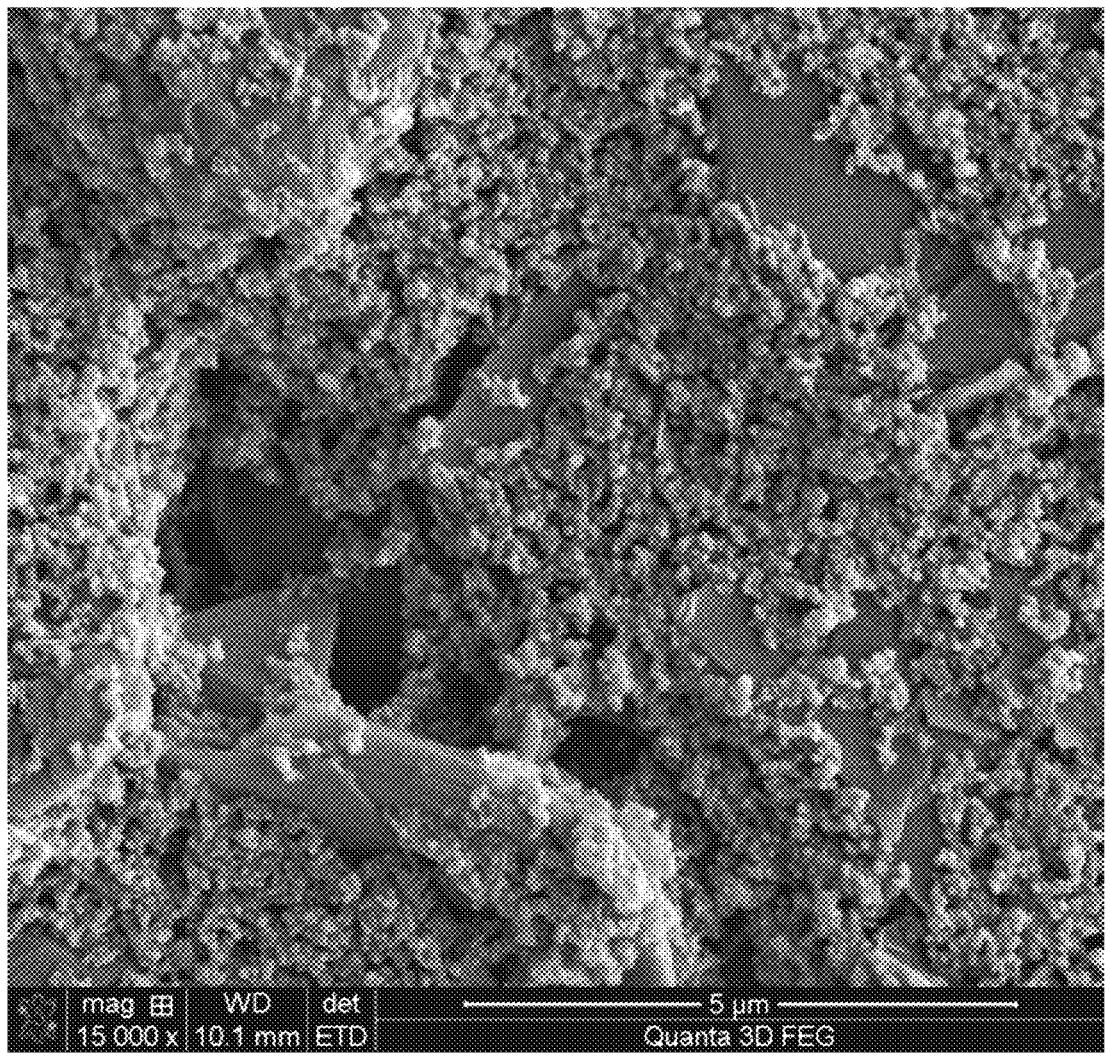
FIG. 4D. Scanning Electron Microscopy (SEM) image of Prussian blue deposition on a glassy carbon electrode.
FIG. 4E. Scanning Electron Microscopy (SEM) image of $CeO_2$/Graphene deposition.
Figure 4D:
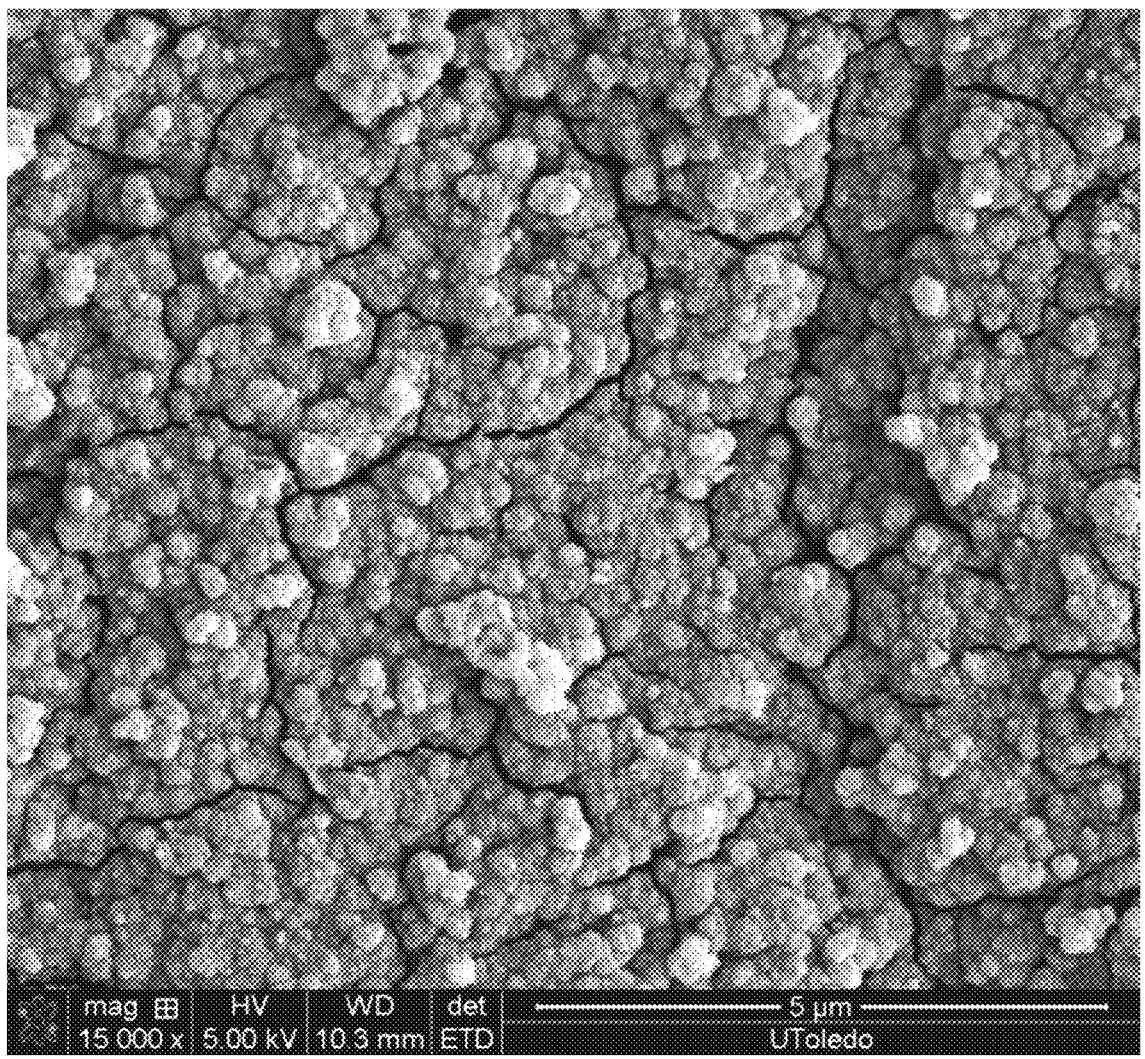
Figure 4E:
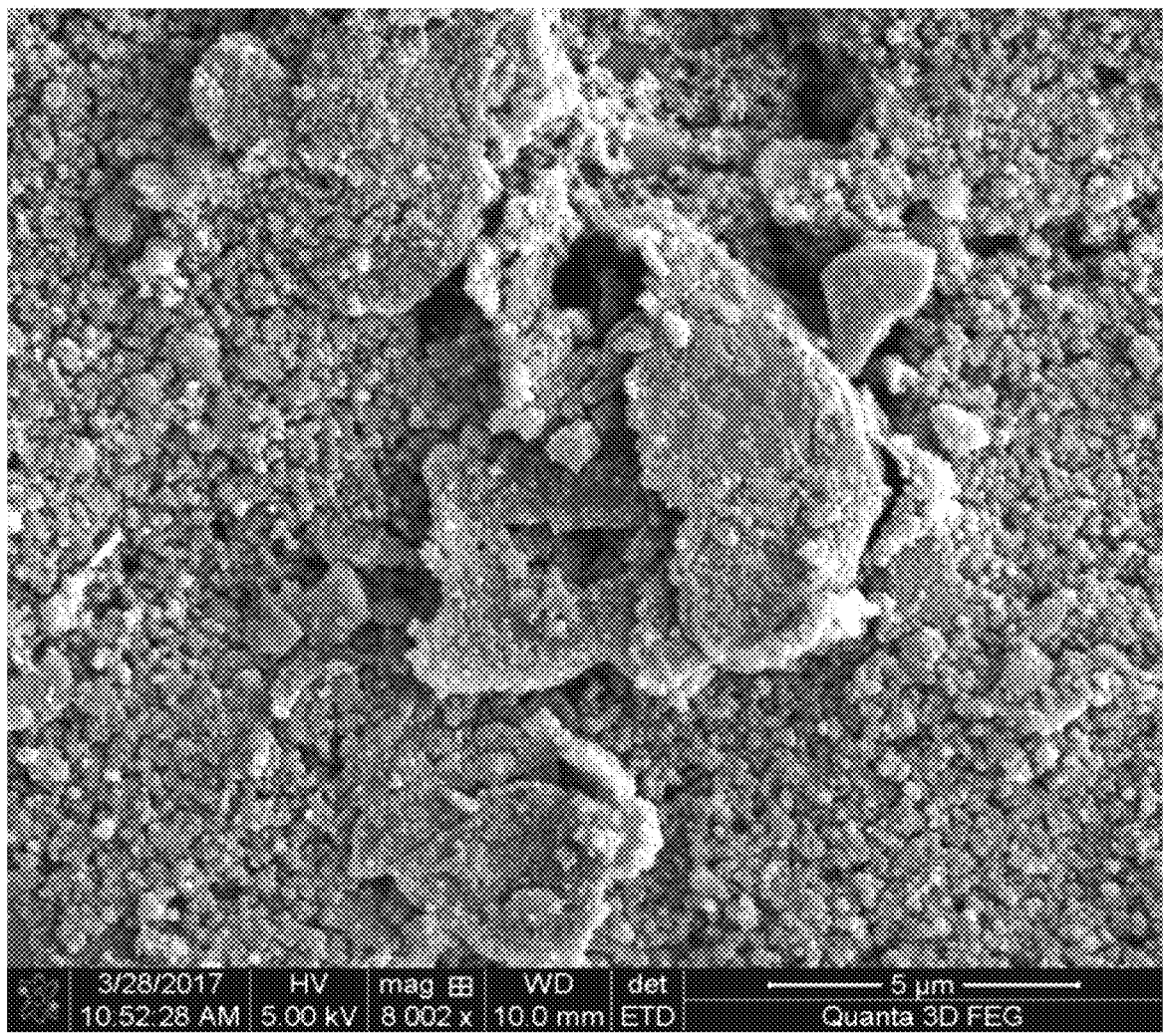

The cerium/graphene/Prussian blue composite is well consolidated and durable, and the composite is also stable against abrasion against the tissue matrix. FIGS. 4A-4E show scanning Electron Microscopy (SEM) images of: of bare graphite electrode surface (FIG. 4A); cerium/graphene composite deposited on the graphite surface (FIG. 4B); a glassy carbon electrode (FIG. 4C); Prussian blue deposition on a glassy carbon electrode (FIG. 4D); and $CeO_2$/Graphene deposition (FIG. 4E).

Figure 5A:
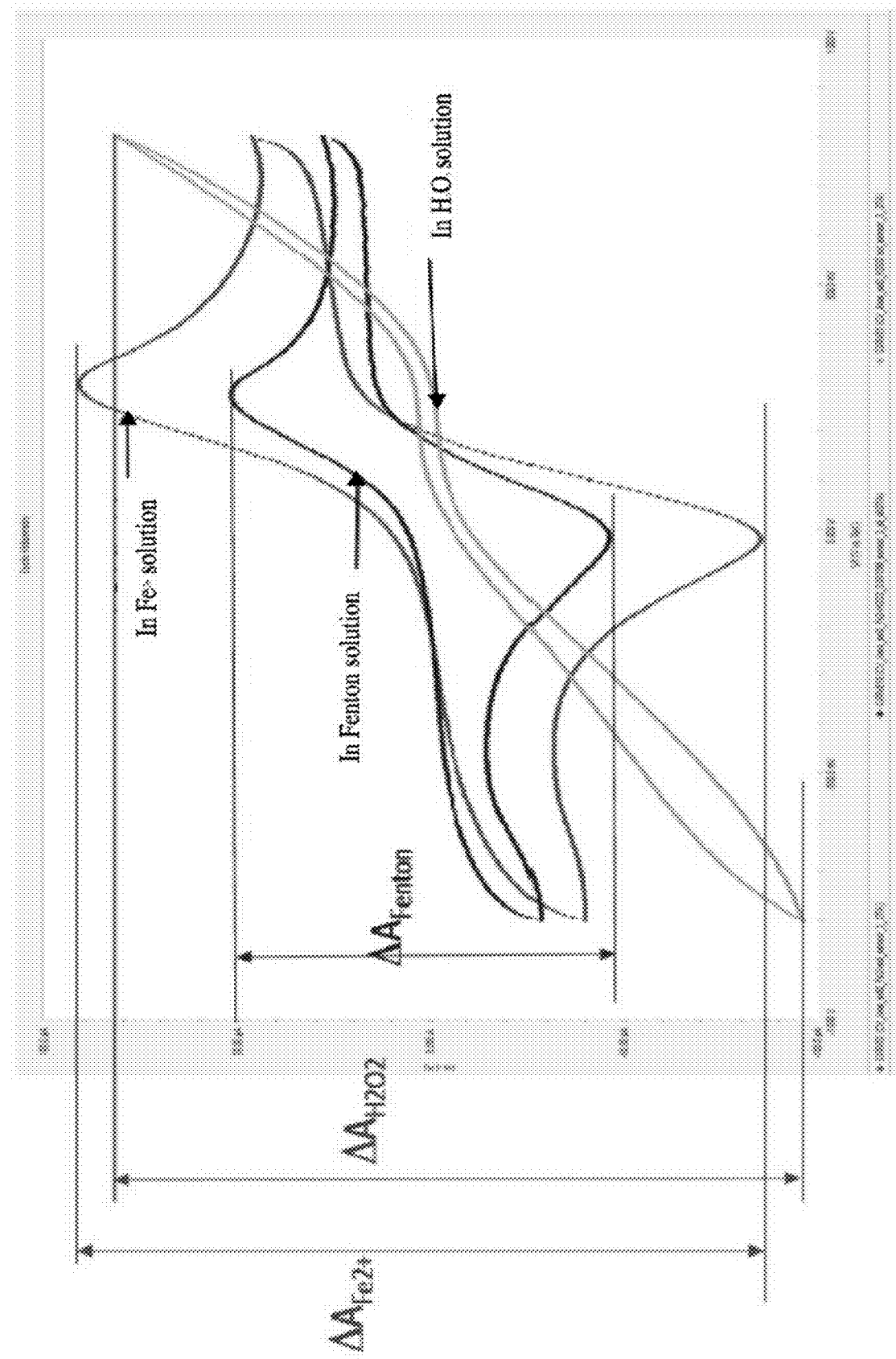
FIG. 5A. CV of hydroxyl radicals and hydrogen peroxide using the composite sensor.
Figure 5B:
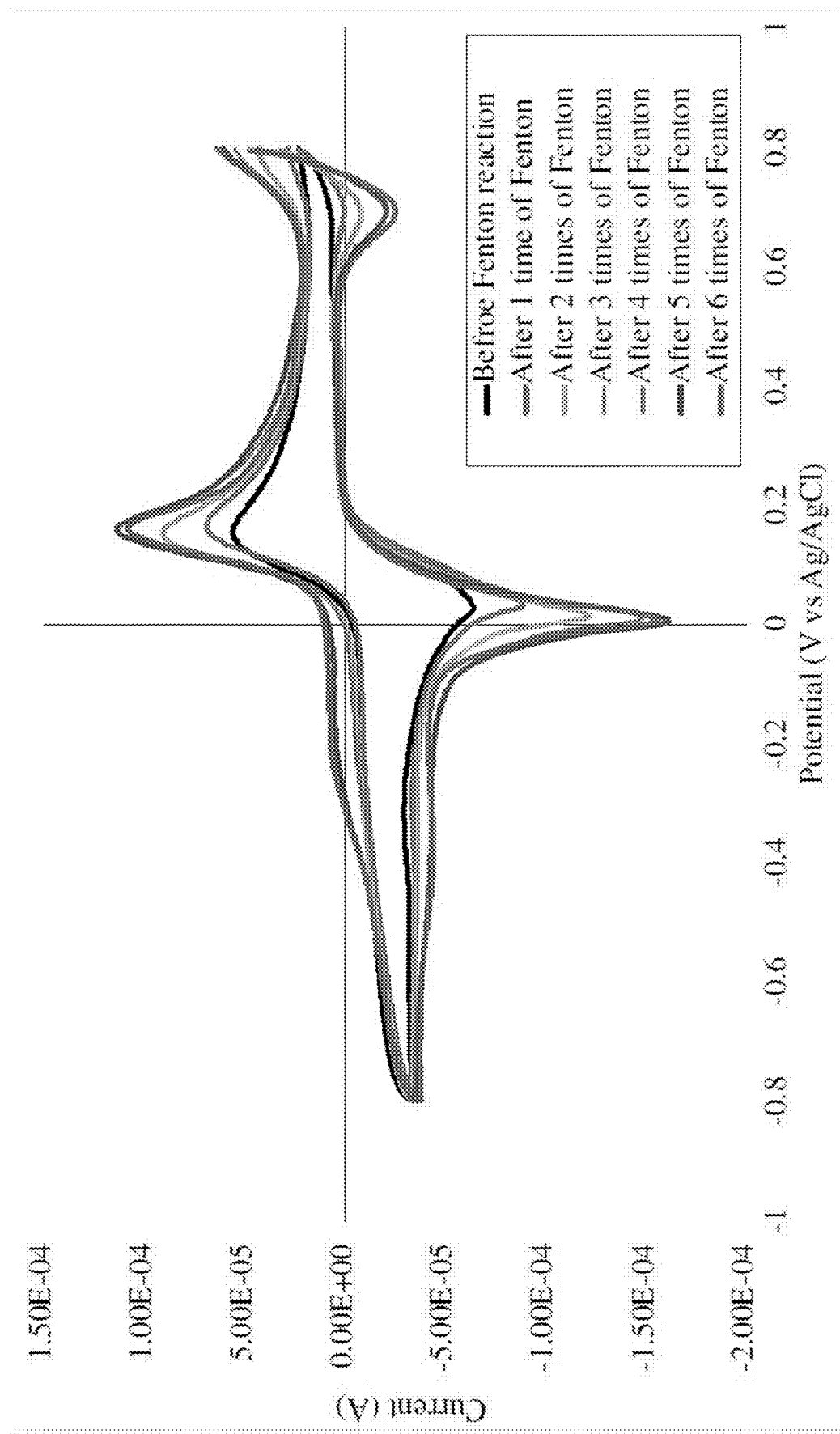
FIG. 5B. CV of hydroxyl radicals and hydrogen peroxide using the composite sensor showing a consistent signal after 6 times of Fenton reactions.

FIGS. 5A-5B show the cyclic voltammetry (CV) curves of the composite sensor for hydrogen peroxide and hydroxyl radicals. In FIG. 5A, $\Delta A_{H2O2}$ (180 µA) represents a current change of the sensor in a 100 mM $H_2O_2$ solution. When the sensor contacted with 100 mM $FeSO_4$ solution, the current change, $\Delta A_{Fe2+}$, showed a similar change with the $H_2O_2$ solution. Hydroxyl radicals were generated by mixing these two solutions according to the Fenton reaction between $Fe^{2+}$ and $H_2O_2$. The composite sensor showed $\Delta A$ of 100 mA, a 56% decrease from the $\Delta A$s' of the $H_2O_2$ and $FeSO_4$ solutions. This shows that the composite sensor was responsive to hydroxyl radicals. FIG. 5B shows CV of hydroxyl radicals and hydrogen peroxide using the composite sensor showing a consistent signal after 6 times of Fenton reactions.

The composite sensor was tested with hydroxyl radicals produced from animal cells. Macrophage extracted from a mouse was used as a model for animal proteins. The 200 µl of macrophage protein solution was used for the test. Initially 200 µL of 10 mmol of $H_2O_2$ solution were added onto the sensor deposited on the composite sensor deposited on a working electrode of a screen printed electrode. Then, CV and EIS were performed. Onto the $H_2O_2$ solution, 200 µL of protein solution was added on top of the $H_2O_2$ solution, followed by CV and EIS measurements. Then, 200 µL of 10 mmol $Fe_2SO_4$ were added to the protein solution to start the Fenton reaction that generates hydroxyl free radicals in the protein suspension. During the Fenton reaction, CV and EIS were run. The CV results are presented in FIGS. 6A-6B.

Figure 6A:
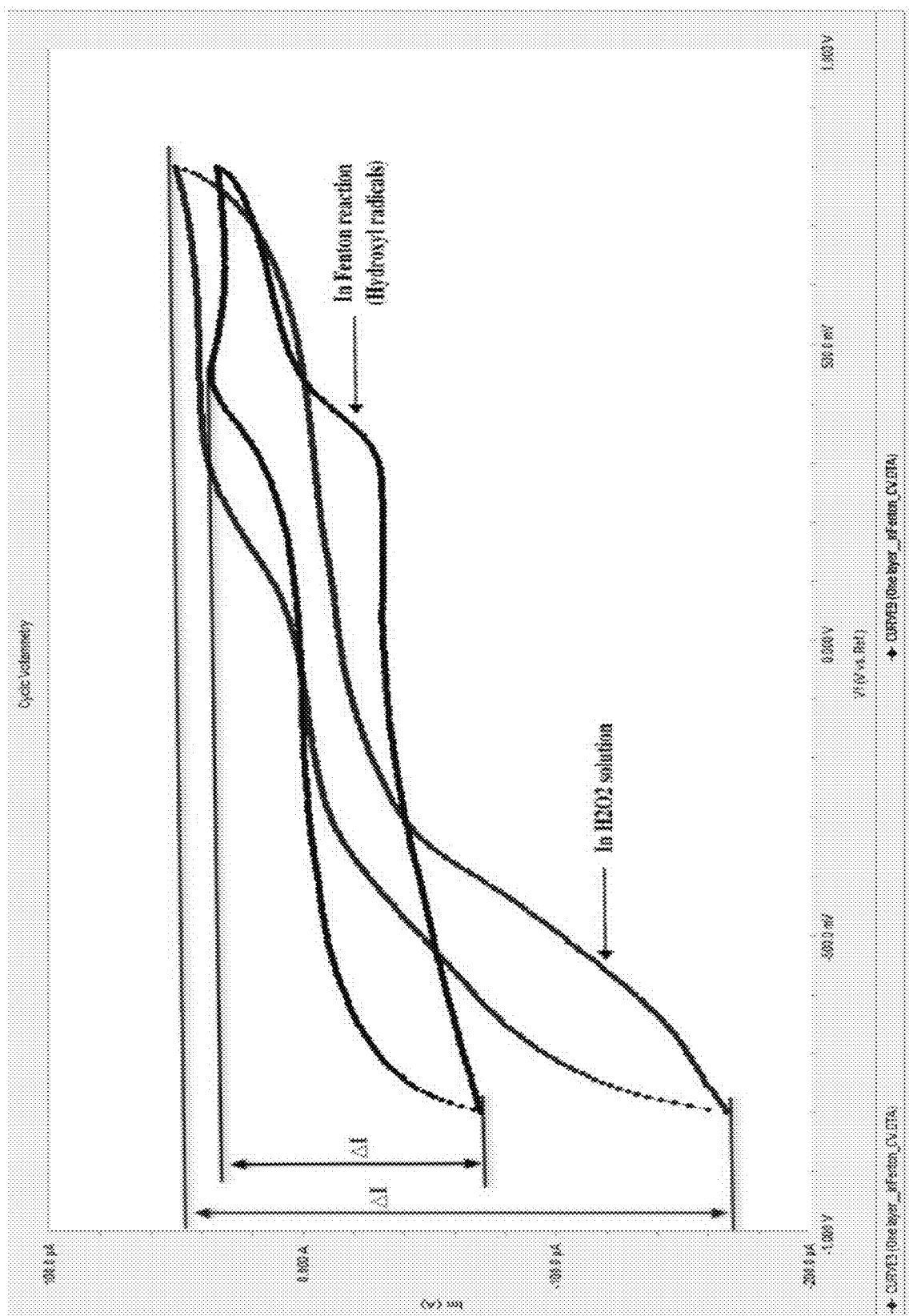
FIG. 6A. CV curves of the sensor for protein with $H_2O_2$ solution and hydroxyl radicals.

FIG. 6A compares the current changes ($\Delta A$) of the protein solution containing $H_2O_2$ (blue curve) and the protein solution with hydroxyl free radicals from the Fenton reaction. When only $H_2O_2$ was present, CV showed $\Delta A$=230 µA. When hydroxyl free radicals were generated in the protein suspension, AA decreased to 110 µA due to the redox reaction between the sensor and hydroxyl free radicals.

Figure 6B:
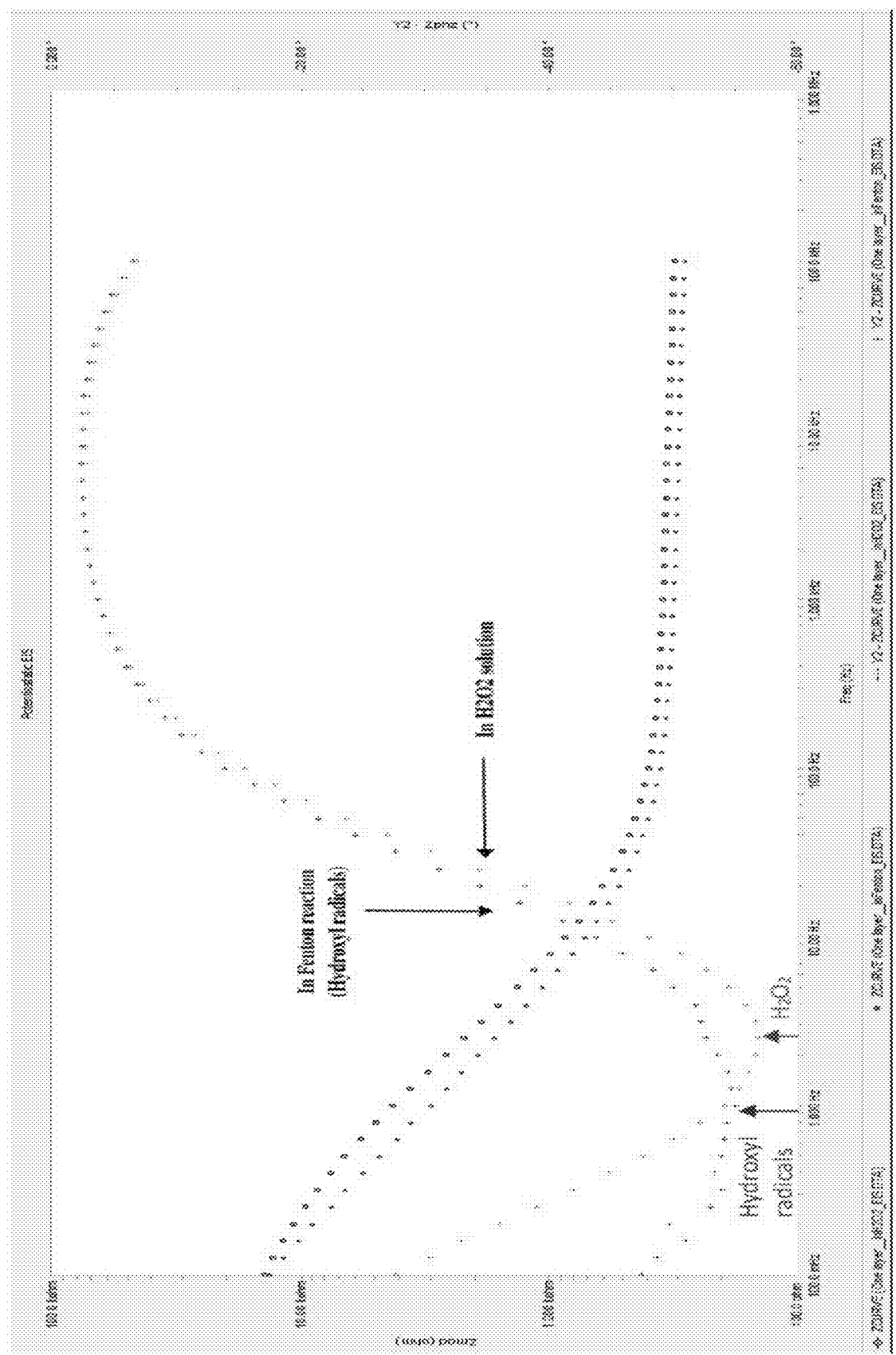
FIG. 6B. EIS curves of the sensor for protein with $H_2O_2$ and hydroxyl radicals.

In FIG. 6B, the sensor demonstrates sensitivity towards hydroxyl radicals compared to $H_2O_2$. Within the tested range of frequency, 100 mHz (0.1 Hz) and 1.0 MHz, the impedance signal from OH radicals were lower than that from $H_2O_2$. Moreover, EIS shows that the sensor can distinguish hydroxyl radicals from $H_2O_2$ as the phase angle shift of hydroxyl radicals occurs at 1 Hz whereas the phase angle shift of $H_2O_2$ occurs at 3 Hz (FIG. 6B).

In addition, the composite sensor was tested with hydroxyl radicals in the presence of red blood cells (hemoglobin, Hb). The test conditions were the same as the ones used in the test for animal proteins described above.

Figure 7A:
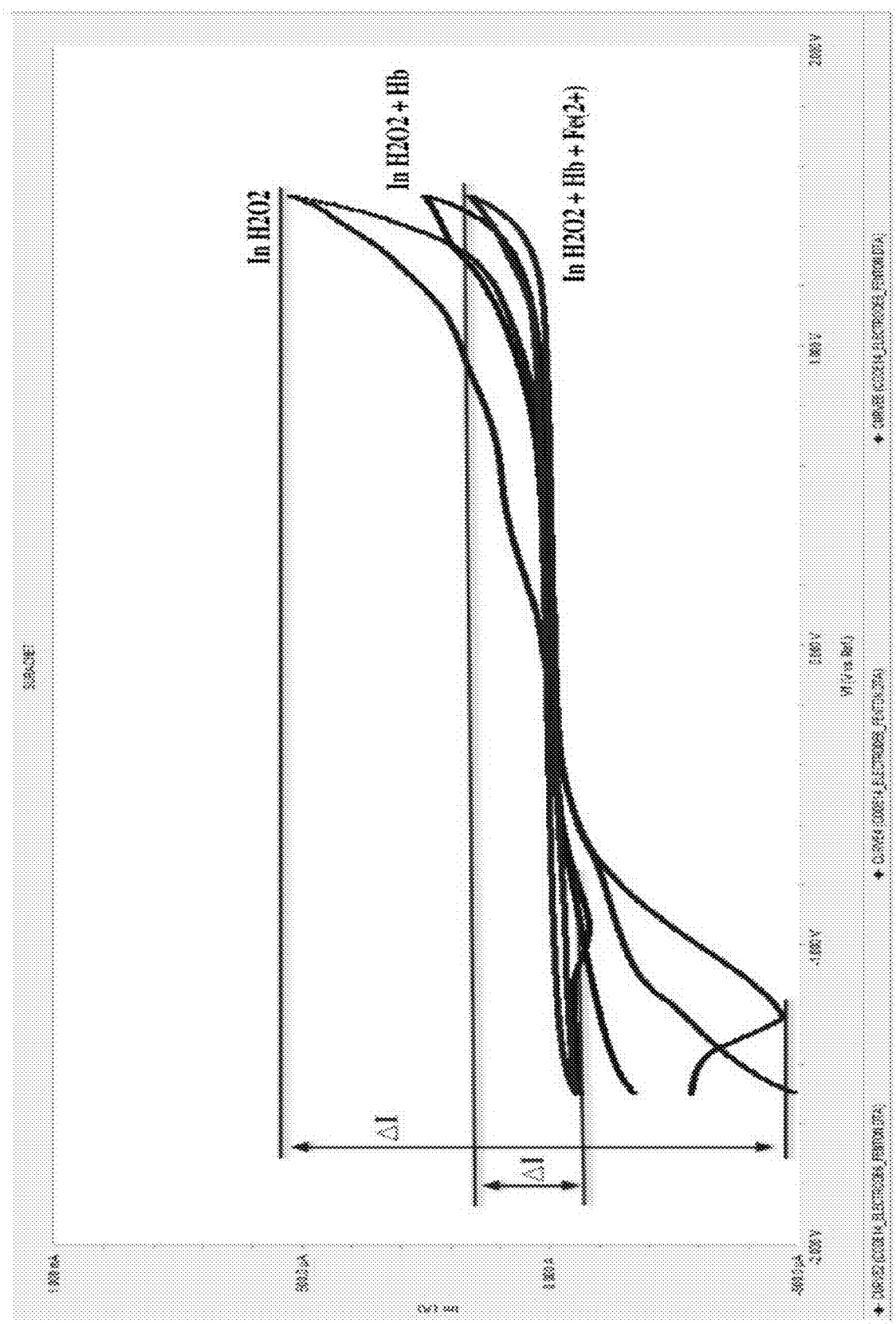
FIG. 7A. CV for red blood cells in the presence of hydrogen peroxide and hydroxyl radicals.

CV test results shown in FIG. 7A demonstrate that hydroxyl free radicals were detected as $\Delta A_{OH}$=450 mA in the presence of Hb, which was about 550 mA lower than the current change for hydrogen peroxide, $\Delta A_{H2O2}$ (1,000 mA).

In addition, the composite sensor was tested with hydroxyl radicals in the presence of red blood cells (hemoglobin, Hb). The test conditions were the same as the ones used in the test for animal proteins described above.

CV test results shown in FIG. 7A also demonstrate that hydroxyl free radicals were detected as $\Delta A_{OH}$=450 mA in the presence of Hb, which was about 550 mA lower than the current change for hydrogen peroxide, $\Delta A_{H2O2}$ (1,000 mA).

Figure 7B:
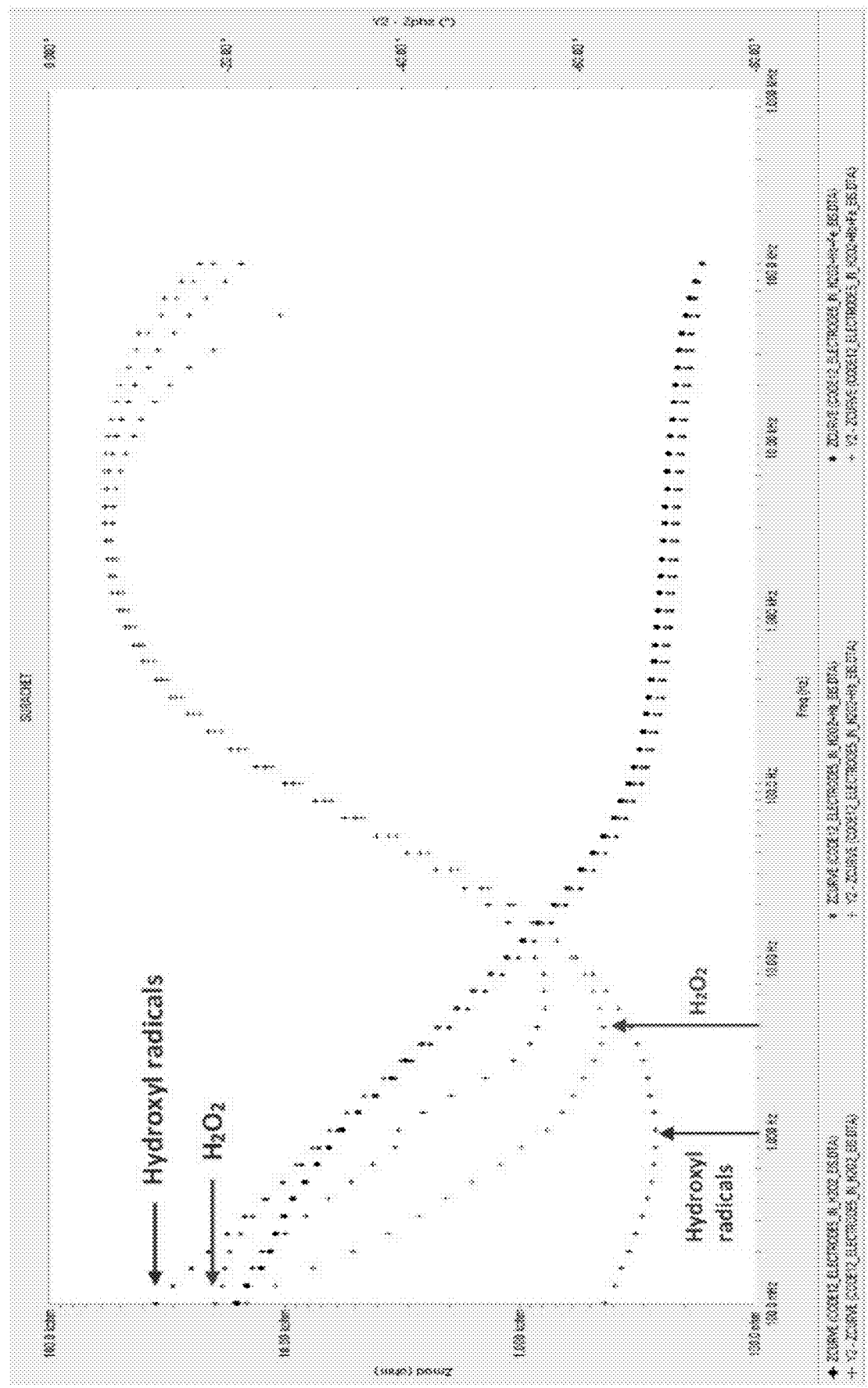
FIG. 7B. EIS for red blood cells in the presence of hydrogen peroxide and hydroxyl radicals.

FIG. 7B is a Bode plot of impedance changes for $H_2O_2$ and hydroxyl radicals in the presence of red blood cells. The sensor distinguished hydroxyl radicals from $H_2O_2$ as it showed 36 kΩ for hydroxyl radicals, whereas 20 kΩ for hydrogen peroxide at 100 mHz. The phase angle shift also proved that hydroxyl radical's phase angle shift occurred its characteristic 1 Hz as compared to the hydrogen peroxide shift at 3.5 Hz.

Both the CV and EIS results shown in FIGS. 5-7 demonstrate that the composite sensor can not only detect and measure the concentration of hydroxyl radicals, but it can also distinguish it from $H_2O_2$.

Non-limiting examples of applications of the sensor include use in medical diagnosis by monitoring free radicals as a biomarker for cancer, tumor, or neurodegenerative diseases such as Alzheimer's disease and Parkinson's disease.

The sensor is also useful in environmental areas. The free radical sensor is used to monitor the amount of hydroxyl radicals produced by the reaction between UV light and ozone that destroy the pollutants in advanced oxidation process (AOP) technology. Currently, there is no direct way to measure the free radicals in AOP.

The sensor is also useful in foods and food-related environments. Free radicals such as nitro oxide and superoxide produced from food toxins and pollutants can be measured as indication of contamination of food and air and water pollution.

In food industry, the free radical sensor is useful to detect food toxins in the stored foods. Currently, oxygen sensors or pH sensors are used in most grocery stores. However these prior oxygen sensors are not very accurate to determine the toxin levels of foods. In contrast, the free radical sensor described herein is easily inserted into foods such as meat, fish, and dairy products to determine the freshness of foods.

All publications, including patents and non-patent literature, referred to in this specification are expressly incorporated by reference herein. Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

While the invention has been described with reference to various and preferred embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof.

Therefore, it is intended that the invention not be limited to the particular embodiment disclosed herein contemplated for carrying out this invention, but that the invention will include all embodiments falling within the scope of the claims.

What is claimed is:

1. A sensor for detecting free radicals in a sample, the sensor comprising an electrode having proximal end and a distal end, the distal end at least partially coated with:
    an inner coating comprising Prussian Blue, and configured to catalyze rapid electron transfer;
    and, an outer coating at least partially coating the inner coating, the outer coating comprising a second material comprised of a cerium oxide/graphene composite.

2. The sensor of claim 1, wherein the second material has enhanced selectivity toward hydroxyl radicals, and improved reversibility of oxidation-reduction reaction.

3. The sensor of claim 1, wherein the electrode is a glassy carbon, gold, silver or platinum electrode.

4. The sensor of claim 1, wherein the free radicals are reactive oxygen species (ROS).

5. The sensor of claim 1, wherein the sensor is further coated with permeable layer to separate the second coating composite from contact with a tissue sample.

6. The sensor of claim 1, wherein the first and second coatings undergo a redox reaction when in the presence of free radicals in the sample.

7. The sensor of claim 1, wherein the electrode is configured to receive a signal from the redox reaction, which signal is analyzed with electrochemical impedance spectroscopy (EIS).

8. A method for making a sensor capable of sensing free radicals, comprising:
    i) at least partially coating at least a distal end of an electrode comprising an inner coating of Prussian Blue, said inner coating catalyzing rapid electron transfer;
    and, ii) at least partially coating a cerium/graphene composite on the coated distal end of the electrode of step i).

9. The method of claim 8, wherein step ii) includes running a cyclic voltammetry to achieve the cerium/graphene composite deposition on the electrode.

10. The method of claim 8, wherein step ii) includes running electrochemical impedance spectroscopy (EIS) in a range of 100 mHz to 100 Hz.

* * * * *